(12) United States Patent
Hellouin et al.

(10) Patent No.: US 6,455,625 B1
(45) Date of Patent: Sep. 24, 2002

(54) ENAMEL APPLICATION COMPOSITION AND METHOD FOR MAKING ENAMELLED FORMED PARTS

(75) Inventors: Rémy Hellouin, Chantilly; Vincent Cholet, Metz; Jean-Pierre Genevay, Montbrison, all of (FR)

(73) Assignees: Sollac, Puteaux (FR); Becker Industrie, Montbrison Cedex (FR)

( * ) Notice: Subject to any disclaimer, the term of this patent is extended or adjusted under 35 U.S.C. 154(b) by 0 days.

(21) Appl. No.: 09/806,916
(22) PCT Filed: Oct. 6, 1999
(86) PCT No.: PCT/FR99/02381
§ 371 (c)(1), (2), (4) Date: May 11, 2001
(87) PCT Pub. No.: WO00/21897
PCT Pub. Date: Apr. 20, 2000

(30) Foreign Application Priority Data

Dec. 10, 1998 (FR) .............................. 98 12769

(51) Int. Cl.$^7$ .................................. C08K 3/40
(52) U.S. Cl. ...................................... 524/494
(58) Field of Search ........................... 524/494

(56) References Cited

U.S. PATENT DOCUMENTS

| 4,500,698 | A | | 2/1985 | Disteldorf et al. |
| 4,782,128 | A | | 11/1988 | Gras et al. |
| 4,795,796 | A | * | 1/1989 | Haubennestel ............... 528/28 |
| 5,312,868 | A | | 5/1994 | Abe et al. |
| 5,325,580 | A | | 7/1994 | Gruber et al. |

FOREIGN PATENT DOCUMENTS

EP 219 131 4/1987

* cited by examiner

*Primary Examiner*—Paul R. Michl
(74) *Attorney, Agent, or Firm*—Sughrue MIon, PLLC

(57) ABSTRACT

The invention concerns a liquid composition comprising more than 50 wt. % of frit, a solvent and a thermosetting resin containing: at least a polyhydroxypolyester and/or a polyhydroxypolyacrylate whereof the OH index ranges between 3 and 100 mg KOH/g and with a molecular weight less than 100000 g/mol; at least a crosslinking agent adapted to cause the hydroxy functions of said polymers to react by transesterification or polyaddition. Said composition provides stability facilitating coating on sheet metal at room temperature, good adherence of the crosslinked coating on the sheet metal, enabling forming before vitrification of the frit.

18 Claims, 2 Drawing Sheets

ENAMEL APPLICATION COMPOSITION AND METHOD FOR MAKING ENAMELLED FORMED PARTS

Figure 1:
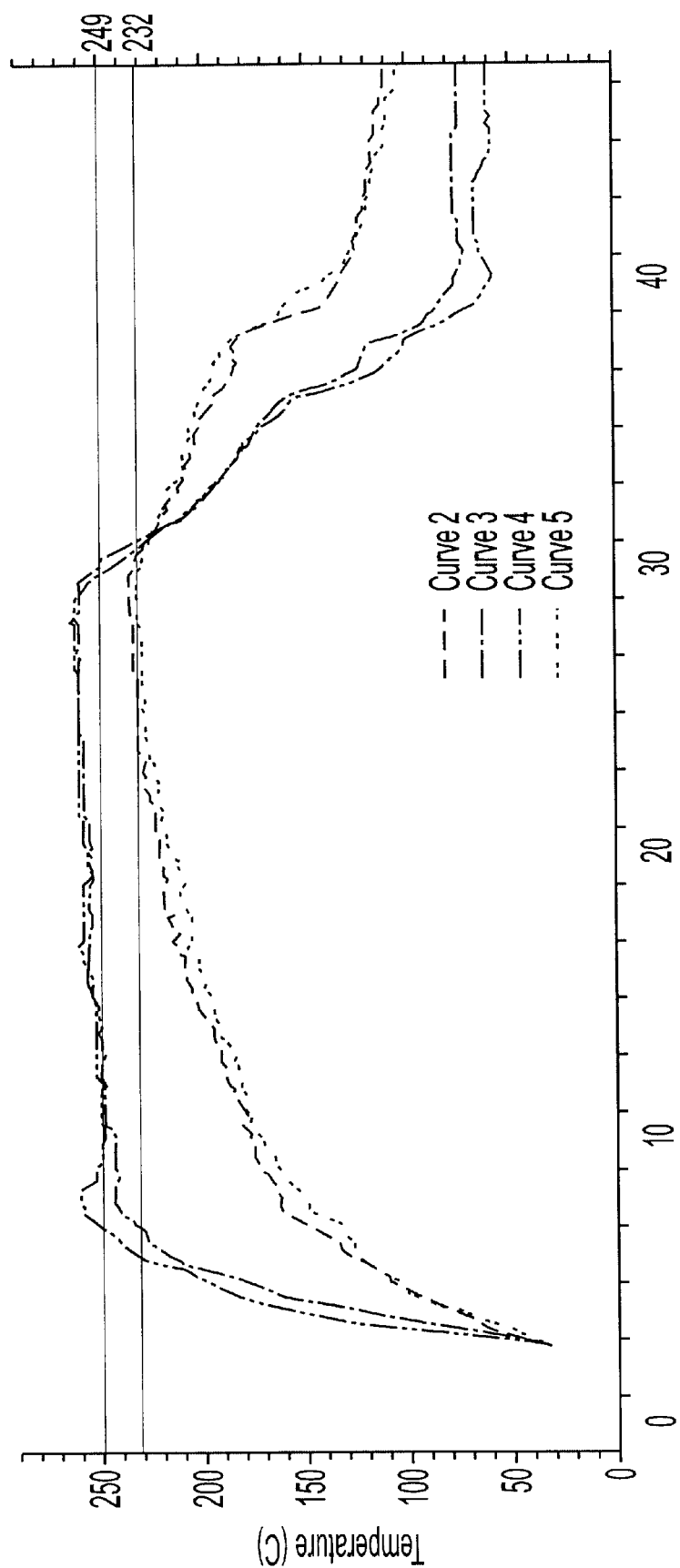

The invention relates to a composition for the application of enamel and to a process for enameling metal components.

The document U.S. Pat. No. 5,325,580—Bayer—discloses a process for the production of shaped components made of enameled sheet metal, in which:

before shaping, at least one enamel application composition layer comprising a vitrifiable enamel frit dispersed in a polymer binder is applied to a steel sheet and then this at least one layer is dried and/or cured, the metal sheet is subsequently shaped into the shape of the component, optionally, at least one other layer of vitrifiable enamel frit is subsequently applied to the component, the component is subsequently fired at a temperature of between 560° C. and 850° C. under conditions suited to the nature of the steel and of the enamel frit which are used, in order to obtain vitrification of the enamel.

The optional curing before shaping is a crosslinking curing of the polymer binder, whereas the firing after shaping is a vitrification firing of the enamel at a temperature greater than the glass transition temperature $T_g$ of the vitrifiable enamel frit.

Thus, the temperature of the first curing (crosslinking) is far below the temperature of the second firing (vitrification).

During the first curing, the polymer binder is "consolidated" by crosslinking, whereas, during the second firing, it is "removed" by thermal decomposition and/or pyrolysis.

The metal sheet obtained is coated with a wholly inorganic layer of "vitreous enamel" comprising a continuous vitreous phase in which inorganic opacifying and/or coloring fillers are dispersed; throughout the continuation of the document, the terms "vitrifiable enamel" or "vitreous enamel" are denoted more concisely by "enamel"; this adopted term is thus completely different from vitreous or nonvitreous polymer coatings with a high content of fillers formed of inorganic components, sometimes denoted as "enamel", in particular because they do not comprise a continuous vitreous phase.

Such a process is highly advantageous as application to flat sheet metal of an enameling layer before shaping makes it possible to avoid all the complications relating to an operation for the application of the same layer to a preshaped component.

Furthermore, steel sheets precoated with enameling composition but not yet shaped can, in this intermediate state, be transported and stored while awaiting the shaping and the vitrification firing of the enamel.

The enamel application composition essentially comprises a polymer binder in solution in a solvent and an enamel frit in suspension in the solution; in addition, this composition generally comprises a suspension (or antisettling) aid, wetting agents and air release agents.

According to Example 1 of the document U.S. Pat. No. 5,325,580, use is made, as binder, of thermoplastic blends of polyhydroxypolyacrylate and polyhydroxy-polyester polymers (proportions 9:1 to 6:4); these blends are devoid of nitrogen or of halogens; these blends do not crosslink during the drying operation (<50° C.) carried out after application of the enameling composition.

In these blends, the percentage by weight of "hydroxyl" groups is between 0.5 and 10% by weight.

The viscosity of the 50% solutions of these polymers is generally between 3 000 and 10 000 mPa.s at 23° C.

The choice is made, as polyhydroxypolyesters, of known polyesterpolyols which are, for example, based on (1) aliphatic, aromatic or cycloaliphatic dicarboxylic acids (and corresponding anhydrides) and (2) aliphatic polyhydric alcohols.

Use is made, for example, of dicarboxylic acids having an average molecular mass of between 146 and 150, such as adipic acid, phthalic acid, tetrahydro-phthalic acid, hexahydrophthalic acid or their mixtures.

Use is made, for example, of polyhydric alcohols having a molecular weight of between 62 and 150, such as ethylene glycol, propylene glycol, butane-1,4-diol, hexane-1,6-diol, glycerol, trimethylolpropane or their mixtures.

These polyesterpolyols are prepared conventionally from these dicarboxylic acids and these polyhydric alcohols and, in the polyhydroxypolyester, the proportion of "hydroxyl" groups is adjusted according to the excess of polyhydric alcohol.

According to Example 1 of the abovementioned document, it is thus possible to use a thermoplastic binder comprising 80% of hydroxypolyacrylate (obtained by radical polymerization in the presence of di-t-butyl peroxide) and 20% of hydroxypolyester (obtained by polymerization by condensation of a mixture of phthalic anhydride, adipic acid and 1,2-propylene glycol with trimethylolpropane).

According to Example 4 of the document U.S. Pat. No. 5,325,580, use is made, as binder, of a thermosetting blend of acid-functionalized polyhydroxy-polyacrylate polymers and of epoxy-functionalized polyhydroxypolyacrylate polymers (in this instance: glycidyl methacrylate); this blend then crosslinks during the curing operation (>50° C., in this instance 350° C.), carried out after application of the enameling composition, by reaction of the acid functional groups with the epoxy functional groups of the polymers.

Use is made, as frit, of, for example, a vitreous base suited to the enameling of sheet metal and exhibiting the following composition:

For the base enameling, intended for the first layer in contact with the metal:

| Frit | Weight % |
| --- | --- |
| $SiO_2$ | 40–51 |
| $Al_2O_3$ | 1–5 |
| $B_2O_3$ | 11–18 |
| $K_2O$ | 0–5 |
| $CaO$ | 2–13 |
| $Na_2O$ | 7–15 |
| $Li_2O$ | 0–6 |
| $BaO$ | 0–15 |
| $ZrO_2$ | 0–6 |
| $CoO$ | 0.5–1.5 |
| $MnO$ | 0–2 |
| $CuO$ | 0–3 |
| $NiO$ | 1–4 |
| $P_2O_5$ | 0–3 |
| $F_2$ | 0–3 |

For the "white" enameling, intended for the surface layer, applied before or after shaping:

| Frit | Weight % |
| --- | --- |
| $SiO_2$ | 35–45 |
| $Al_2O_3$ | 0–4 |
| $B_2O_3$ | 14–20 |

-continued

| Frit | Weight % |
|---|---|
| $K_2O$ | 2–9 |
| $Na_2O$ | 7–11 |
| $Li_2O$ | 0–2 |
| $TiO_2$ | 13–22 |
| ZnO | 0–2 |
| MgO | 0–2 |
| CaO | — |
| $P_2O_5$ | 0–4 |
| $F_2$ | 0–5 |

Use is made, as solvent, of, for example, a mixture of xylene and methoxypropyl acetate, or an aromatic mixture with a high boiling point, such as the product referenced Solvesso 150 from Exxon, or cyclohexanone, or glycol ether esters.

Use may be made, as agent for holding in suspension, of, for example, magnesium silicate hydrate.

To prepare the enamel application composition, the following procedure, for example, is carried out:

a component of the polymer binder is heated, the agent for holding in suspension is added thereto, slowly and with stirring, the frit is subsequently added, followed by the solvent with the wetting agents, the air release agents and other additives, the mixture is ground until a satisfactory dispersion of the enamel frit is obtained, after cooling, the other component of the polymer binder, for example the epoxy-functionalized polyacrylate, is subsequently added.

Introduction of the binder in two stages is particularly important in the case of thermosetting binders, as it is a question of preventing or of limiting the crosslinking of the mixture at this stage in the preparation.

The proportions of the main constituents of the enamel application composition obtained are given in the following table:

| U.S. Pat. No. 5 325 580: | Example 1 | Example 4 |
|---|---|---|
| Solvent | 16.1% | 23.9% |
| Binder | 17.1% | 14.0% |
| Frit | 63.3% | 56.2% |
| Additives: | 3.5% | 5.9% |

By expressing the viscosity of the enamel application composition thus obtained according to Standard DIN 53 211 (by using a DIN-4 flow cup with an opening of 4 mm), times of between 40 and 200 seconds are obtained, according to the application method used and the desired coat thickness (for example 110 $\mu$m after drying).

The enamel application compositions obtained are subsequently applied with a roll coater on untreated steel sheets which have simply been degreased.

To obtain significant enamel thicknesses, it is possible to apply a composition in several successive coats (2 wet coats with a thickness of 110 $\mu$m for example).

In the case of a polyacrylate-polyester thermoplastic binder (Example 1 already mentioned), drying is subsequently carried out of the coat applied at ambient temperature for approximately 1 minute.

In the case of a polyacrylate thermosetting binder based on a blend of acid-functionalized polymers and of epoxy-functionalized polymers (Example 4 already mentioned), curing is subsequently carried out at 350° C. for approximately 30 seconds, which results in crosslinking of the blend by reaction of the "acid" functional groups with the "epoxy" functional groups of the two polyacrylates of the binder.

The steel sheets thus coated with an enameling composition (also in the "rough" state) are subsequently shaped and then subjected to an appropriate firing treatment, first to remove, by pyrolysis, the organic binder from the composition without disturbing the cohesion of the coating and, secondly, to fire and vitrify the enamel of this composition.

This heat treatment can, for example, be carried out according to the following characteristics:

| Temperature . . . | 200° C. | 300° C. | 400° C. | 600° C. | 820° C. |
|---|---|---|---|---|---|
| . . . achieved after: | 2 min. | 4 min. | 5 min. and end of pyrolysis | 6 min. | 8 min. + maintenance 3.5 min. |

Shaped components made of enameled sheet metal are thus obtained.

Thermosetting binders or resins are preferred to thermoplastic binders as enamel composition polymer binder because they make it possible to obtain more stable "rough" coatings; the metal sheets thus coated are more resistant to solvents; the enamel composition coating is better at withstanding the shaping operation.

However, the disadvantage of the type of thermosetting resin provided in the document U.S. Pat. No. 5,325,580—in particular in Example 4—is its lack of stability at ambient temperature in the uncrosslinked state, the hydroxyl and epoxy groups having a tendency to react even at ambient temperature.

This lack of stability gives rise to a change in the viscosity which requires frequent adjustments of the application conditions, in particular in the case of coating with a roll coater.

An aim of the invention is to present an enamel application composition with a crosslinkable binder, intended to be applied to sheet metal before shaping, which is very stable before application to sheet metal and thus much easier to apply.

The document U.S. Pat. No. 5,312,868 discloses a paint or varnish application solid film or sheet which is devoid of solvent; this film comprises a thermosetting polymer resin and organic or inorganic fillers, such as gloss control agents; this document also discloses a process for coating a substrate in which this sheet or film is applied to the substrate and then a heat treatment of the coated substrate is carried out, so as to crosslink the resin; in the case of a metal sheet, a product comparable to a painted or varnished metal sheet is then obtained.

According to the information carried in column 7, lines 28 et seq., the average molecular weight (Mw) of the thermosetting resin is greater than 100 000 because, for lower values, the coating to be applied is difficult to maintain in the form of a sheet and there is a risk of it wrinkling after application to the substrate.

According to one of the five alternative forms mentioned, column 4, lines 43 to 48, the coating film comprises gloss control agents; the gloss control agents mentioned, column 15, line 56 to column 17, line 42, include conventional paint or varnish components, such as granules of organic or inorganic coloring pigments, granules of thermoset or thermoplastic resin, and granules of metal oxides or metals; mention is made, among metal oxides, of alumina, silica, glass and even enamel.

After application and curing, the substrate obtained has a coating, the continuous phase of which coating, composed of the crosslinked polymer, is organic, which is comparable to a conventional paint or to a varnish; the substrate obtained would obviously be unsuitable for vitreous enameling by a subsequent vitrification firing treatment, even if the starting film comprised glass and/or enamel, in particular because, in this coating film:

the proportion of glass and/or of enamel would be insufficient to produce an enamel layer of acceptable quality, the presence of other organic or inorganic components, conventional in the field of paints, would obviously be harmful to the production of an enamel layer of acceptable quality.

In particular, in Table 1 of column 17 of this document, the proportion of glass granules in the starting thermosetting film, which does not comprise. solvent, does not exceed 50%; whereas, in this case of an enamel application composition comprising a solvent as disclosed in Examples 1 and 4, already mentioned, of U.S. Pat. No. 5,325,580—Bayer, there will be present, according to the table below:

| U.S. Pat. No. 5 325 580:<br>weight of Frit/ . . . | Example 1 | Example 4 |
| --- | --- | --- |
| . . . /weight of the enamel application composition: | 63.3% | 56.2% |
| . . . /weight of the coating film (evaporated solvent): | 75.4% | 73.8% |

Thus, the proportion of glass granules in a coating film according to U.S. Pat. No. 5,312,868 is much less than that of vitreous enameling frit (73.8%) in a "rough" coating film according to U.S. Pat. No. 5,325,580.

The characteristic relating to the high level of vitrifiable enamel frit in enamel application compositions is important in limiting the proportion of organic phase in the dry coating, indeed even crosslinked coating, and in facilitating the complete removal of this organic phase during the vitrification firing, a necessary condition in obtaining a vitreous enamel layer of acceptable quality.

The use of a resin of high average molecular weight in U.S. Pat. No. 5,312,868, greater than 100 000 g/mol, which is necessary for the production of a thermo-setting film which can be handled, exhibits disadvantages, however:

the level of filler which can be incorporated is limited because of problems of wettability of the fillers in the resin, in particular in the case of inorganic fillers, such as enamel frits, the adhesion to the substrate is insufficient, even after crosslinking, to withstand subsequent shaping operations because of problems of wettability of the substrate by the resin.

The solution to these problems, which would consist in heating the enamel application composition to lower its viscosity, presents other problems: costs of the heating plants and of safety, risks of premature crosslinking.

Another aim of the invention is to present a composition for application of enamel on a metal sheet which, although incorporating more than 50% by weight of enamel frit:

remains sufficiently fluid to wet both the enamel frit and the metal sheet, to be easy to apply to the metal sheet, in particular by coating with a roll coater, gives, after application and crosslinking, a coating which is sufficiently adherent to the metal sheet to withstand subsequent shaping operations.

To this end, a subject matter of the invention is a liquid composition for application of vitreous enamel of the type mainly comprising a thermosetting polymer resin, a solvent of said resin and more than 50% by weight of vitrifiable enamel frit, characterized in that said resin comprises:

one or more polyhydroxypolyester polymers and/or one or more polyhydroxypolyacrylate polymers in solution and/or in emulsion, exhibiting an OH (or hydroxyl) number of between 3 and 100 mg KOH per gram, which are appropriate for the average molecular weight of the dissolved fraction of said polymers to be less than 100 000 g/mol, at least one crosslinking agent suitable for reacting with the "hydroxyl" functional groups of said polymers by transesterification or by polyaddition, in an amount sufficient to crosslink said resin, an amount of catalyst sufficient to catalyze the reaction of the hydroxyl groups of said polymers and of the at least one crosslinking agent.

Other advantageous characteristics of the composition according to the invention are defined in the dependent claims.

One of these characteristics relates to the use of an aminoplast compound as crosslinking agent; this characteristic is advantageous because the compositions crosslinked from this agent exhibit better mechanical properties and are better able to withstand shaping than the compositions which are crosslinked using a blocked isocyanate; furthermore, aminoplast compounds are cheaper than blocked isocyanates.

Another subject matter of the invention is a process for the production of a metal sheet coated with vitrifiable enamel comprising the stages consisting in:

preparing a vitreous enamel application composition according to the invention, applying said composition to the metal sheet to be coated, curing the metal sheet thus coated with said composition under conditions suitable for crosslinking said resin.

At the end of application and/or at the beginning of curing, the solvent present in said composition is removed by evaporation.

The application of said composition in preferably carried out by coating.

A "preenameled" metal sheet is then obtained, which can be shaped before vitrification firing of the frit.

Another subject matter of the invention is a process for the production of a metal sheet coated with vitrified enamel, characterized in that it comprises a stage of vitrification firing of a metal sheet coated with vitrifiable enamel obtained by the above process.

Another subject matter of the invention is a process for the production of a shaped component made of enameled sheet metal comprising the stages consisting in:

preparing a vitreous enamel application composition according to the invention, applying said composition to a metal sheet, curing the metal sheet, thus coated with said composition, under conditions suitable for crosslinking said resin, shaping the metal sheet, coated with said crosslinked composition, into the shape of said component to be produced, firing the shaped component, coated with said crosslinked composition, under conditions suitable first for producing complete pyrolysis of said crosslinked resin and suitable secondly for vitrifying said vitrifiable frit.

The application of said composition in preferably carried out by coating.

Thus, to recap, a first object of the invention is the preparation of a metal sheet coated with a composition prepared from one of more thermosetting resins, from one or more solvents and from a vitrifiable enamel frit; this composition can be easily applied to the metal sheet in the liquid state, preferably continuously; it is crosslinked by curing; the thickness applied, measured after crosslinking curing, can be greater than 100 µm; the cohesion between the metal sheet and the crosslinked composition coat or coats is sufficiently strong to allow the coated metal sheet to be shaped by drawing, without the risk of decomposition or of loss of cohesion.

The firing of the components, optionally shaped, is subsequently carried out under controlled conditions to allow the complete removal of the organic part of the composition and the vitrification of the enamel frit, so as to form a continuous vitreous phase; thus, a second object of the invention is the preparation of components made of enameled sheet metal in the sense of components coated with vitreous enamel comprising a continuous vitreous phase.

A better understanding of the invention will result from reading the description which will follow, given without implied limitation.

An enameling composition is conventionally prepared from the following main components: binder based on thermosetting polymer resin, solvent of the resin and vitrifiable enamel frit in a proportion by weight of greater than 50%.

According to the invention, the thermosetting polymer resin comprises:

one or more polyhydroxypolyester polymers and/or one or more polyhydroxypolyacrylate polymers prepared so as to exhibit:
an OH (or hydroxyl) number of between 3 and 100 mg of KOH per gram of resin, preferably between 3 and 40 mg KOH/g,
an average molecular weight of less than 100 000 g/mol,
at least one crosslinking agent suitable for the "hydroxyl" functional groups of said polymers, in an amount sufficient to crosslink said resin,
an amount of catalyst sufficient to catalyze the reaction of the hydroxyl groups of said polymers and of the at least one crosslinking agent.

The polyester resins used for the invention are oil-free resins prepared in accordance with known methods (refer, for example, to the document EP-A-237 749) by reaction in the neat melt or in organic solvents at temperatures generally of between 200 and 260° C.

Use is preferably made of polyester resin solutions which exhibit a viscosity of between 2.5 and 5.5 Pa.s, measured in accordance with Standard DIN 53 214.

Use may be made, for the manufacture of these polyester resins, of conventional starting materials used for the manufacture of polyester resins, the proportions of each of the components having to be chosen on each occasion so that the polyester resin obtained exhibits the characteristics mentioned, in particular with regard to the OH number.

Use may be made, as "acid" components, alone or as a mixture, of:

aromatic dicarboxylic and/or polycarboxylic acids, such as, for example: phthalic acid, terephthalic acid, isophthalic acid, trimellitic acid and pyromellitic acid;

aliphatic dicarboxylic and polycarboxylic acids, such as, for example: succinic acid, glutaric acid, adipic acid, pimelic acid, suberic acid, azelaic acid, sebacic acid, 2-ethylhexanecarboxylic acid or isononanoic acid; use may also jointly be made of unsaturated carboxylic acids, for example maleic acid, fumaric acid, itaconic acid or citraconic acid;

cycloaliphatic dicarboxylic and polycarboxylic acids, such as, for example: tetrahydrophthalic acid, hexahydrokyphthalic acid, 1,4-cyclohexanedicarboxylic acid or methylcyclohexane-dicarboxylic acid;

aromatic monocarboxylic acids, such as, for example: benzoic acid, alkyl-substituted benzoic acids, naphthenic acids and their isomers or abietic acid and its isomers, benzoic acid preferably being used.

Particularly preferred polyester resins are obtained by using terephthalic acid or mixtures of terephthalic acid and adipic acid, if appropriate in conjunction with monocarboxylic acids.

The carboxylic acids mentioned for the manufacture of the polyester resins can be used either in the form of free acids or in the form of their derivatives (for example anhydrides or esters).

Use may be made, as "alcohol" components, alone or as a mixture, of linear or branched, aliphatic and/or aromatic and/or cycloaliphatic diols and/or polyols.

Use is preferably made of aliphatic diols and/or polyols, such as glycols, for example ethylene glycol, propylene glycol, neopentyl glycol, butane-1,4-diol, hexane-1,6-diol, 2,2,4-trimethylpentane-1,3-diol, diethylene glycol or triethylene glycol, or triols and polyols, for example trimethylolethane, trimethylolpropane, glycerol, ethoxylated glycerol and propoxylated glycerol, pentaerythritol, dipentaerythritol, ditrimethylolpropane, mannitol and sorbitol.

Use may also be made, for the invention, of commercial polyester resins exhibiting the following characteristics:

linear or branched polyester, average molecular mass M, measured by gel permeation chromatography, of less than 100 000 g/mol, preferably of between 10 000 and 25 000 g/mol, OH number of between 3 and 100 mg KOH/g, preferably of between 3 and 40 mg KOH/g.

The polyacrylate resins used for the invention are prepared in accordance with conventional methods by copolymerization of an acrylic monomer comprising hydroxyl groups with one or more unsaturated monomers which can be polymerized in the radical manner.

Examples of appropriate monomers comprising hydroxyl groups are $C_2$–$C_8$ hydroxyalkyl esters of acrylic acid and methacrylic acid, such as, for example, hydroxyethyl acrylate, hydroxyethyl methacrylate, hydroxypropyl acrylate, hydroxypropyl methacrylate and 2-ethylhexyl acrylate and/or methacrylate; these monomers comprising hydroxyl groups can be used either individually or as a mixture of two or of more of them.

Any component having an ethylenically unsaturated bond capable of copolymerizing in the radical manner can be used as monomer, if it is copolymerizable with the monomer comprising hydroxyl group; these components are chosen in a way known per se according to the properties desired for the acrylate copolymerisate; representative examples of monomers of this type are, inter alia, alkyl esters of acrylic acid and of methacrylic acid, vinylaromatic compounds, α,β-unsaturated carboxylic acids, or amides of acrylic acid or methacrylic acid; additional details relating to these monomers and to the appropriate preparation conditions appear in the document DE-PS-32 01 749, pages 3 to 5.

Use may also be made, for the invention, of commercial polyacrylate resins exhibiting the following characteristics:
- average molecular mass M of less than 100 000 g/mol, preferably of less than or equal to 5 000 g/mol in the case of resins prepared in the solvent phase;
- OH number of between 3 and 100 mg KOH/g, preferably of between 3 and 40 mg KOH/g.

According to an alternative form, use may be made of commercial resins prepared as an aqueous emulsion; in this case, the molecular mass of these resins is preferably greater than or equal to 100 000 g/mol.

Use is preferably made, as crosslinking agent suitable for the "hydroxyl" functional groups of the polymers of the resin, of a blocked isocyanate or an aminoplast compound.

Use may be made, as blocked isocyanate, alone or as a mixture, of a diisocyanate, a linear triisocyanate, a cyclized triisocyanate (isocyanurate), a biuret, polyisocyanates, prepolymers or adducts.

The term "adduct" is understood to mean a reaction product of an isocyanate with a product comprising an active hydrogen atom.

The isocyanate or the mixture of isocyanates is preferably suited to exhibiting a content by weight of NCO radicals of between 10 and 25% with respect to the total dry weight of the crosslinking agent.

The isocyanate or the mixture is added to the enameling compositions, preferably in an amount such that the ratio of equivalence of the OH groups of the binder (slim of the OH groups of the polyester and/or polyacrylate polymers and, if appropriate, of those of the other components of the binder comprising hydroxyl groups) to the NCO groups of the crosslinking agent is between 0.5 and 2.5.

Mention may be made, as example of blocked isocyanate, of the blocked polyisocyanate mixtures as disclosed in the documents FR 2 544 322, U.S. Pat. No. 3,577,493, EP 251 267 or JP 02 097536 A.

The "blocked" nature can be obtained by blocking agents; for example, a phenol, a polypropylene glycol, an oxime, such as methyl ethyl ketoxime, acetone oxime, cyclohexyl oxime or butanone oxime, a triazole, such as benzotriazole, a caprolactam, such as ε-caprolactam, a β-dicarbolyl compound, such as ethyl acetoacetate or ethyl malonate, or also the malonic diester, a carbodiimide or N-hydroxysuccinimide, or also the adduct of trimethylolpropane blocked caprolactam, can be chosen as blocking-agent.

The "blocked" nature can be obtained by the very nature of the isocyanate, which is then said to be "self-blocked"; a dimerized isocyanate or, in the family of the IPDIs, IPDI uretidione can be chosen as example of self-blocked isocyanate.

Examples of appropriate aliphatic and cycloaliphatic diisocyanates and polyisocyanates are hexamethylene diisocyanate, decamethylene diisocyanate, isophorone diisocyanate, 4,4'-dicyclohexylmethane diisocyanate, lysine diisocyanate, bis(4-crocyanato-cyclohexyl)methane ($H_{12}MDI$), tetramethyl-m-xylidene diisocyanate (TMXDI) and dimerized and trimerized derivatives of these diisocyanates.

Use may also be made of aromatic diisocyanates and polyisocyanates, such as 4,4'-diphenylmethane diisocyanate (MDI), 4,4'-diphenylene diisocyanate, 4,4'-diphenylene diisocyanate, 2,4-tolylene diisocyanate (TDI) and 2,6-tolylene diisocyanate (TDI), m-phenylene diisocyanate, p-phenylene diisocyanate, 1,5-naphthalene diisocyanate, 3,3'-dimethyl-4,4'-biphenylene diisocyanate, 3,3'-dimethoxy-4,4'-biphenylene diisocyanate, 3,3'-diphenyl-4,4'-biphenylene diisocyanate, 4,4'-biphenylene diisocyanate, 1,3,5-benzene triisocyanate, para, para', paral'''-triphenylmethane triisocyanate and xylylene diisocyanate.

A commercial product, such as, for example:
- from Bayer, the Desmodur® products referenced BL 3175, LS 2759 or TPLS 2957, based on HDI; BL 4165 and LS 2078, based on IPDI; TPLS 2117, based on $H_{12}HDI$; and BL 1265, based on TDI;
- from Creanova (formerly Hüls), the Vestanat® products referenced EPB 1481, based on IPDI; B 1370 and FPB 1186A;
- from Rhodia (formerly Rhône-Poulenc): Tolonate® referenced D2, based on HDI; can also be taken as blocked isocyanate.

The aminoplast compound is preferably selected from the group comprising alkylated urea-aldehyde, melamine-aldehyde, dicyandiamide-aldehyde and triazine-aldehyde compounds; the alkylation is carried out, for example, with an alcohol, such as methanol or butanol.

The aldehydes used in reaction with the amino compound are, for example, formaldehyde, acetaldehyde and acrolein or aldehyde precursors, such as paraformaldehyde and hexamethylenetetramine.

Other examples of aminoplast compounds are disclosed in the document U.S. Pat. No. 3,804,920.

Use is preferably made of melamine derivatives having at least four groups of the type:

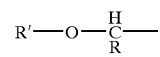

attached to the amino group of the melamine structure, where R is a hydrogen atom or a monovalent alkyl radical comprising from 1 to 5 carbon atoms and R' is an alkyl group comprising from 1 to 6 carbon atoms.

Use is preferably made of hexamethoxymethyl-melamine as aminoplast compound.

The amount of aminoplast added is preferably appropriate for the ratio of the mass of resin by the mass of aminoplast compound to be between 1.5 and 15.

The catalyst is added to the binder of the enameling composition to promote rapid crosslinking under industrial conditions, after application of this composition to the metal sheet to be enameled; the choice of the catalyst is suited in a way known per se, in nature and in proportion, to the nature of the crosslinking agent:
- in the case of isocyanates, a catalyst based on dibutyltin laurate (DBTL) can be taken, for example,
- in the case of aminoplasts, a catalyst based on blocked para-toluenesulfonic acid (PTSA) can be taken, for example.

For the preparation of the enameling composition according to the invention, polyhydroxypolyester polymers or polyhydroxypolyacrylate polymers or a mixture of polyhydroxypolyester polymers and of polyhydroxypolyacrylate polymers is used without distinction in the binder, provided that the OH (or hydroxyl) number remains between 3 and of 100 mg KOH/g, preferably between 3 and 40 mg KOH/g.

The thermosetting system obtained does not comprise "epoxy" functional groups but is thus crosslinkable by transesterification reaction, in the case of the use of aminoplast compounds as crosslinking agent, or by polyaddition reaction, in the case of the use of blocked isocyanates as crosslinking agent.

Use is made, as vitrifiable enamel frit, of the same base (referred to as "bulk") or glaze frits as those generally used for the enameling on bare steel sheets when the application of the enamel is carried out after the shaping of the metal sheets.

The usual compositions for frits are indicated in the tables below:

For the base enamel, intended for the first adherent layer applied in contact with the metal:

| Frit | Weight % |
|---|---|
| $SiO_2$ | 40–60 |
| $Al_2O_3$ | 0–7 |
| $B_2O_3$ | 10–20 |
| $K_2O$ | 0–8 |
| CaO | 0–10 |
| $Na_2O$ | 5–20 |
| $Li_2O$ | 0–10 |
| BaO | 0–20 |
| $ZrO_2$ | 0–10 |
| CoO | 0.5–2.5 |
| MnO | 0–4 |
| CuO | 0–4 |
| NiO | 1–5 |
| $P_2O_5$ | 0–5 |
| $F_2$ | 0–7 |
| $TiO_2$ | 0–5 |

For the white enamel, intended for the surface layer, applied before or after shaping:

| Frit | Weight % |
|---|---|
| $SiO_2$ | 30–50 |
| $Al_2O_3$ | 0–5 |
| $B_2O_3$ | 12–24 |
| $K_2O$ | 1–10 |
| $Na_2O$ | 5–15 |
| $Li_2O$ | 0–4 |
| $TiO_2$ | 0–25 |
| ZnO | 0–3 |
| MgO | 0–3 |
| CaO | — |
| $P_2O_5$ | 0–5 |
| $F_2$ | 0–5 |

The enameling composition generally comprises conventional additives in a proportion of less than 10% by weight, for example dispersing agents, antisettling agents, leveling agents, antifoaming agents, stabilizing agents and wetting agents.

The antisettling agents are particularly important in this instance for the stability on storage and in the feed vessels for the coating means, in particular because the enameling compositions have a high content of solid materials.

The choice of solvent is suited in a way known per se to obtaining a good solvating power with respect to the components of the binder.

The proportion of solvent with respect to the total weight of enamel composition is generally less than or equal to 25%; this proportion must be adjusted according to the specific viscosity criteria appropriate for the method of application of the enameling composition.

Use may be made, for adjusting the viscosity of the enamel application composition, of aliphatic and/or aromatic hydrocarbons, such as, for example, the solvent Naphta®, various types of Solvesso® and of Shellsol®, xylene or esters, such as, for example, methoxypropyl acetate and butyl glycol acetate, or ketones, such as, for example, cyclohexanone.

When the enameling composition is applied with a roll coater (coil coating), a solvent is preferably chosen with a boiling point of between 120° C. and 200° C., which corresponds to a conventional industrial criterion for this type of application.

To prepare the enameling composition, its components and additives are mixed and/or dispersed.

Thus, the polymers of the resin being in solution and/or in emulsion in a solvent, the enamel frit is dispersed in this solution or emulsion with stirring at ambient temperature and the other components, namely the crosslinking agent, the catalyst and the other additives, are subsequently added to the suspension obtained.

The nature and the proportion of the polymers in solution are chosen so that the average molecular mass of the blend of these polymers is less than 100 000 g/mol, preferably less than 50 000 g/mol.

In the case where a fraction of the polymers in the blend is in emulsion, indeed even all the polymers, it is preferable for the average molecular mass of this fraction in emulsion to be greater than or equal to 100 000 g/l.

If appropriate, the blend obtained is diluted using a solvent, in order in particular to adjust the viscosity according to the method of application envisaged.

The enamel application composition obtained always comprises a solvent, whether it is the solvent added for the dilution and/or the solvent of the starting polymer products, when they are in solution or in emulsion; the enamel application composition obtained is thus liquid at ambient temperature.

The proportions of binder, of solvent and of frit are adjusted in order for the content by weight of frit to be greater than 50% of the total weight of enamel application composition; by virtue of the type of binder used and despite the high charge of frit, it is found that the frit is suitably wetted. This enameling composition is particularly stable at ambient temperature, so that it can be used without specific precautions in feeding industrial plants for application to metal sheets:

it is physically stable as the solid matter remains dispersed in a homogeneous and stable way in suspension in this composition, it is stable chemically as, by virtue of the choice of the method of crosslinking (via hydroxyl group alone, in contrast to the document U.S. Pat. No. 5,325 580) and crosslinking agents, there is no crosslinking reaction at this temperature: furthermore, the viscosity of this composition is stable and does not change as a function of time, which facilitates the control of the application conditions.

To apply this enamel composition continuously on strips of sheet metal, it is preferable to operate by coating using, preferably, a plant for application with a roll coater; use is made, for example, of the method referred to as reverse coil-coating.

By virtue of the type of binder used and despite the high charge of frit, it is found that the viscosity of the enamel application composition which is obtained remains sufficiently low to be able to apply it easily to sheet metal by coating.

The composition according to the invention can advantageously be used for the production of shaped components made of enameled sheet metal in the following way:

before shaping, this composition is applied to the metal sheet and then the metal sheet thus coated is cured under conditions suitable for crosslinking the polymer binder of this composition, the metal sheet, coated with this crosslinked composition, is subsequently shaped into the shape desired for the enameled component to be produced; by virtue of the type of binder used and despite the high charge of frit, it is found that the crosslinked composition coating adheres sufficiently to the metal sheet to withstand the shaping operation, the shaped component is subsequently fired under conditions suitable first for producing complete pyrolysis of the crosslinked polymer of the coating composition and suitable secondly for producing vitrification of the enamel of this composition.

According to this method for the production of enameled components:

before application of the enameling composition, a degreasing treatment of the metal sheet is generally carried, out; preferably, a phosphatizing treatment of the metal sheet is subsequently carried out to improve the adhesion of the enamel while avoiding any chromic rinsing, in order to avoid contamination by chromium during the vitrification of the enamel, the enameling composition can be applied in several coats; another enameling composition can be applied after the shaping but before the vitrification firing, optimally, for the vitrification firing of the shaped component, it is advisable to separate the stage of pyrolysis of the organic products (resin) from the stage of vitrification melting of the inorganic products (frits).

As regards this vitrification firing heat treatment, there is in practice provided, in the temperature rise thermal profile, a stationary pyrolysis phase with a duration of between 15 seconds and 4 minutes at a temperature of between 350 and 550° C. and preferably of 1 to 2 minutes between 400 and 500° C., which makes it possible to efficiently incinerate the resin without disturbing the melting of the enamel frit, since the temperature then remains below the glass transition temperature of the frit.

The combustion of the resin is rendered easier by maintaining an oxidizing atmosphere in the region of the firing furnace corresponding to this stationary phase; to this end, an additional device with direct flame burners can be added in this region, which device makes possible good simultaneous control of the combustion atmosphere and temperature in this region.

In the case of metal sheets made of steel, the temperature in the region for melting the enamel which follows the region for pyrolysis of the binder is between 500 and 900° C., preferably between 560° C. and 850° C., the lowest temperatures being kept rather for enamels in contact with surfaces with a low melting point, such as those rich in aluminum, for instance for aluminized metal sheets.

The precise determination of the exact conditions for the vitrification firing results from experiments which take into account in particular the ratio of the discharge capacity for flue gases to the throughput of components to be enameled, so as to obtain finished products which are devoid of defects in appearance and which exhibit good adhesion of the enamel to the metal sheet.

In the implementation of the process for the production of shaped components made of enameled sheet metal which has just been described, it is found:

with regard to the shaping, that the crosslinked coating of enameling composition according to the invention exhibits great flexibility, which renders possible major deformations in the metal sheet without risk of damage; the degree of crosslinking of the resin can nevertheless be adjusted according to the flexibility required and in particular so as to obtain a glass transition temperature of the crosslinked composition close to ambient temperature, preferably close to approximately 35° C.;

during the vitrification firing, that the enamel composition coating can be pyrolyzed at a high rate without resulting in surface appearance defects on the enameled metal sheet; this advantage makes it possible to improve the productivity of the firing plants.

This high flexibility for the shaping and this high rate of pyrolysis for the firing result from the nature of the resins employed in the enameling composition according to the invention.

The enameling compositions according to the invention, designed to be applied before shaping, are intended for the production of all shaped components generally produced by enameling on metal sheets for which the depositions of enamels were until now carried out after shaping.

They are applied both to bare steels (hot sheet metals and cold sheet metals) and to coated steels, in particular coated with layers rich in aluminum.

They make it possible in particular to produce components intended for the following markets:

large electrical appliances, for oven or hob components, for lids, cookstove fascias and broilers, small electrical appliances, for small portable electric oven, microwave oven, iron, kettle, waffle iron, scraper and stone grill components, and for household items, such as saucepans, frying pans, stewpots and plates, construction, for exterior cladding, internal walls and architectural or decorative panels, sanitary, for bath tubs, shower trays, sinks or water-heater components.

According to a preferred alternative form of the invention, use is made, for the preparation of the enamel application composition, of at least one (hydroxypolyester and/or hydroxypolyacrylate) polymer which exhibits a COOH number of greater than or equal to 5 mg of KOH equivalent per gram of said polymer.

The wetting power of the enameling composition is thus improved, which facilitates its application, and adhesion of this crosslinked composition to the metal sheet is also improved, which further restricts the risk of damage during shaping.

According to another preferred alternative form of the invention, the enamel application composition comprises, in addition to the conventional additives already mentioned for its preparation, lubricating additives which facilitate the drawing of the metal sheet coated with this crosslinked composition, which further restricts the risk of damage in the shaping stage.

Use is preferably made, as lubricating additive, of a polyethylene wax, for examples a synthetic wax prepared by polymerization of ethylene, so as to obtain a low molecular weight, for example of between 1 000 and 3 000 g/mol; use may also be made of alternative forms to this homopolymer, such as an oxidized polyethylene wax, a copolymer of ethylene and of acrylic acid, or a copolymer of ethylene and of vinyl acetate.

One advantage of the polyethylene wax over other lubricating additives is the ease of removal by pyrolysis during the vitrification firing of the enamel.

The addition of approximately 1% by weight of this lubricating additive with respect to the total weight of composition is suitable for producing a substantial improvement in the lubrication during shaping; this additive is added by simple mixing with the enameling composition with stirring.

Other advantages of the process of the invention will become apparent on reading the examples presented below, without implied limitation, of the present invention and with reference to FIGS. 1 and 2:

FIG. 1 gives the thermal profile (temperature as a function of time) of the drying and crosslinking treatment after application of an enameling composition according to the invention; the curves referenced 1, which are very similar, give the temperature of the treatment atmosphere and the curves referenced 2, which are very similar, give the temperature of the sample during treatment.

Figure 2:
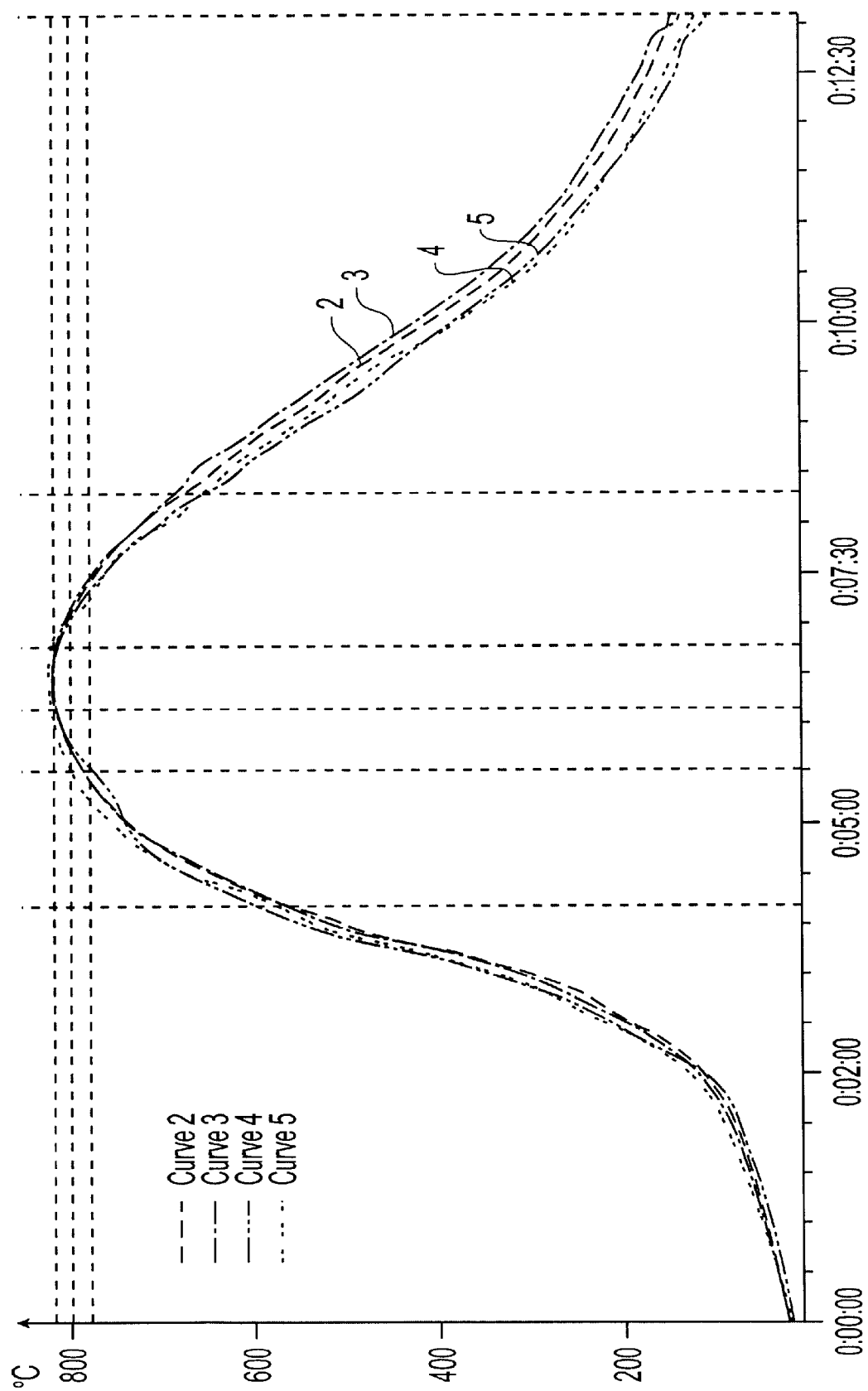

FIG. 2 gives the thermal profile (temperature in ° C. as a function of time in h:min.:sec.) of the vitrification firing treatment after shaping of a metal sheet coated with a crosslinked coat of an enameling composition according to the invention; curves 2, 3, 4 and 5 represent four different recordings for the same programmed thermal profile.

Products used for the Preparation of the Enameled Component Samples

A cold-rolled steel sheet with a thickness of 0.8 mm, referenced commercially Solema from Sollac, is taken as enameling substrate.

The components used for the preparation of the enameling compositions are described below:

1—Commercial resins based on hydroxypolyesters and proportions:

|  | Creanova (formerly Hüls) | | |
| --- | --- | --- | --- |
| Company: | Dynapol | Dynapol | |
| Commercial reference: | LH 818-02 | L 205 | LTW |
| Type of polyester | branched | linear | linear |
| Average molecular mass | 600 g/mol | 15 000 g/mol | — |
| OH number (g KOH/g) (1) | 15 to 25 | 4 to 10 | ≈30 |
| COOH number (g KOH/g) (2) | <3 | <3 | 20 to 30 |
| Proportions/total resin (3): | 83% | 12% | 5% |

(1) measured according to Standard ISO 4629
(2) measured according to Standard ISO 2114
(3) except for test No. 1: idem in proportions but without LTW resin.

2—Crosslinking agent and proportion with respect to the total weight of enamel composition: 1% of an aminoplast compound, referenced Cymel® 303, from Cytec (formerly Dyno Cyanamid).

3—Catalyst and proportion with respect to the total weight of enamel composition: 1% of paratoluenesulfonic acid (PTSA) blocked by an amine.

4—Frit for the enameling of sheet metal, referenced PM 15/2611, from Pemco, exhibiting the following composition:

| Frit | Weight % |
| --- | --- |
| $SiO_2$ | 51 |
| $Al_2O_3$ | 2 |
| $B_2O_3$ | 12 |
| $K_2O$ | 2 |
| CaO | 3 |
| $Na_2O$ | 12 |
| $Li_2O$ | 2 |
| BaO | 3 |

-continued

| Frit | Weight % |
| --- | --- |
| $ZrO_2$ | 2 |
| CoO | 1 |
| MnO | 2 |
| CuO | 0.5 |
| NiO | 1 |
| $P_2O_5$ | 0.5 |
| $F_2$ | 2 |
| $TiO_2$ | 4 |

This is a noncoated powdered bulk enameling frit, referred to as an antiacid frit, that is to say graded A on conclusion of the citric acid test at ambient temperature defined by Standard ISO 2722.

5—Additives and proportion with respect to the total weight of enamel composition:

5.1: dispersing and wetting agent: 0.1% of the product known as Bykumen® from Byk; it is an anionic surfactant formulated mainly using an unsaturated acid polyester and a carboxylic acid.

5.2: antisettling agent: 0.3% of the product known as Aerosil® 380 from Degussa; it is pyrogenic silica.

5.3: lubricating agent (optional): 1% of the product Lubaprint® from Bader: it is essentially an organic solution comprising 9 to 11% by weight of polyethylene wax.

6—Solvent: essentially Solvesso® 150 and esters; the ignition point of the enamel compositions obtained is of the order of 25° C.

Methods used for the Preparation of the Enameled Shaped Components

1. Preparation of the sheet steel substrate: alkaline degreasing, rinsing and amorphous phosphatizing at the iron using a commercial phosphatizing solution referenced Bonderite 901 from Chemetall.

2. Preparation of the enameling composition to be applied to the substrate; proportions of the main components; characteristics obtained:

2.1: procedure:
the commercial resins are mixed,
the enamel frit is dispersed in this mixture with stirring at ambient temperature,
the crosslinking agent is subsequently added to the suspension obtained, followed by the catalyst and the other additives in the proportions indicated above,
dilution is carried out with the solvent.

2.2: proportions in % with respect to the total composition weight, according to the table below:

| Test | Total resins | Frit | Lubricating agent | Solvent |
| --- | --- | --- | --- | --- |
| No. 1 | 15% | 60% | without | 25% |
| No. 2 | 15% | 60% | without | 25% |
| No. 3 | 14% | 60% | 1% | 25% |

2.3: the compositions obtained exhibit the following characteristics:
volume of the enamel frit with respect to the total composition volume (with solvent): 0.66.
weight of the dry matter (solvent evaporated) with respect to the total composition weight (with solvent) : 0.75.
volume of the dry matter (solvent evaporated) with respect to the total composition volume (with solvent): 0.53.

overall relative density of the solvents in the composition: 0.9.

viscosity, measured according to Standard DIN 53 211 (using a DIN-6 flow cup with an opening of 6 mm): 110 seconds.

3. Application of the enameling composition to the substrate and crosslinking:

The composition is applied with a roll coater, in a configuration of reverse coil coating type in which the surface of the application roll coater and that of the substrate move in opposite directions at the point of the application.

A first coat of enamel composition is thus applied to both faces of the metal sheet and then the first coat is dried and crosslinked; a second coat of enamel composition is subsequently applied to both faces and then the second coat is dried and crosslinked.

The application conditions are adjusted in order to obtain a total crosslinked thickness of the order of 130 µm.

The drying and crosslinking heat treatment is carried out under the conditions corresponding to FIG. 1, which gives the change in the temperature (° C.) as a function of time (MIN:SEC) during the treatment; according to this figure, the maximum temperature reached by the metal sheet during the treatment is of the order of 230° C. and the time for maintaining at this temperature is of the order of 1 minute.

4. Shaping: a cookstove component is drawn conventionally from a blank of sheet metal coated with crosslinked enamel composition.

5. Vitrification firing of the component shaped from the metal sheet coated with crosslinked enameling composition.

The shaped components are fired using a tunnel furnace under an ambient atmosphere, the furnace possessing means for discharge of the flue gases, under the thermal conditions represented in FIG. 2, which gives the temperature experienced by a component during treatment as a function of time (hour:min.:s.); curves 2 to 5 correspond to treatments regarded as identical for which the maximum temperature reached during the firing is of the order of 820° C.

Evaluation Tests at Different Stages in the Preparation of the Enameled Shaped Components 1—Tests carried out on the enameling application composition after preparation: for the record, viscosity measurement: see § Methods, point 2.3.

2—Tests carried out on the metal sheet coated with crosslinked enameled composition:

2.1—Tribological properties of the coated surface:

The coefficient of friction on the coated surface is measured using a tribometer in single frictional mode over a ribbed length of 110 mm under an applied pressure varying linearly from 0 to 800 $10^{+5}$ Pa at the rate of 0.1 m/min.

The coefficient value accepted corresponds to the value measured after stabilization, generally as soon as the pressure exceeds 150 to 300 $10^{+5}$ Pa.

2.2—Resistance to cracking and to debonding of the coating:

2.2.1—Resistance to cracking after bending of the metal sheet over itself; testing is carried out according to the test known as the "T bend—Folding method", listed as "T7" by the ECCA, that is to say the European Coil Coating Association, published on Apr.2, 1996.

2.2.2—Resistance to cracking after bending the metal sheet over a conical mandrel; testing is carried out according to Standard NF EN ISO 1519, published in June 1995, by carrying out bending operations over mandrels with increasingly small diameters (Ø); for each bending operation, the coating is observed in the bending region.

2.2.3—Resistance of the coating to cracking and to tearing by rapid deformation or "impact strength" test; testing is carried out according to the test listed as "T5," by the ECCA, that is to say the European Coil Coating Association, published on Dec.14, 1995; the impact energy short of which and for which a) cracks, b) areas which have become detached and c) areas which have become detached up to the substrate are not observed is recorded in Joules.

2.3—Scratch resistance: testing is carried out according to Standard ISO 1518, published in 1992; the minimum load (daN) which produces the scratch, that is to say for which the needle has penetrated the coating, is measured.

2.4—Test of adhesion or peel strength of the coating:

Testing is carried out according to Standard NFT 30038, which describes a "grid" test; scratches or striations are formed in the coating using a scratching tool exhibiting the form of a comb with teeth separated by 1 to 2 mm; an adhesive tape, such as a Scotch® tape, is subsequently applied to the striated region and then this tape is torn off: subsequently, the striated region on which the tape has been torn off is observed; according to these observations, the coating is classified as: category 0=very good peel strength; category 3=moderate peel strength.

2.5—Solvent resistance: a hydrophilic cotton sleeve is impregnated with the help of methyl isobutyl ketone and the coated surface is subsequently rubbed using this impregnated sleeve with to-and-fro movements; 20 to-and-fro (T-F) movements are thus carried out and possible damage to the coating under the action of the solvent, methyl isobutyl ketone, in the region subjected to the rubbing is subsequently observed.

3—Tests carried out on the enameled metal sheet, thus after vitrification firing:

3.1—Adhesion of the enamel to the substrate: this test is carried out according to European Standard EN 10209; it consists in deforming, by impact, the sample of enameled sheet metal by allowing a punch to fall freely on it from a height which depends on the thickness of the metal sheet; the adhesion of the coating is subsequently evaluated according to the surface area of the metal sheet bared by the impact of the punch on the metal sheet in a scale of values 1 to 5: impact not baring the steel, grade 1; impact completely baring the steel, grade 5.

3.2—Surface appearance: this test consists in visually confirming that the enameled surface does not exhibit defects.

3.3—"Fingernail scratches": this test consists in visually confirming that the enameled surface does not exhibit defects of "fingernail scratch" type; Standard EN 10209 defines a test for the evaluation of the resistance to fingernail scratches.

3.4—Evaluation of the resistance of the enamel coat to citric acid: this test is carried out under the conditions defined in Standard ISO 2722 and makes it possible to classify the samples in several categories: from the most effective AA to the least effective D, there are thus the categories AA, A, B, C and D.

TRIALS

Three trials for the preparation of enameled shaped components were carried out starting from the PRODUCTS and according to the METHODS defined above and thus starting from the same polyester base for the binder, except for Trial No. 1, which does not comprise the product LTW with a high COOH number; the essential characteristic of each trial is as follows:

Trial No. 1: enameling composition according to the invention but none of the polymers of the resin has sufficient "acid" groups for its COOH number to be greater than or equal to 5 mg KOH/g, Trial No. 2: enameling composition according to the invention, the resin of which comprises 5% by weight of a polymer possessing sufficient "acid" groups to have a COOH number of greater than or equal to 5 mg KOH/g, in this instance 20 to 30 mg KOH/g, Trial No. 3: enameling composition according to the invention, identical to that of Trial No. 2, to which has been added 1% by weight of a lubricating additive based on polyethylene wax to facilitate the drawing.

During the trial or at the end of the trial, the tests described above in the TESTS paragraph are carried out; the results obtained have been listed in the following table:

| Results of tests . . . during: | Trial No. 1 | Trial No. 2 | Trial No. 3 |
|---|---|---|---|
| 1 - Tests on the composition: | | | |
| viscosity DIN6/20° C. DIN53211 | 110 s. | 110 s. | 110 s. |
| 2 - Tests on nonvitrified coated sheet metal | | | |
| Tribological properties: | | | |
| Coefficient of friction: | 0.20 | 0.20 | 0.13 |
| Resistance to cracking: | | | |
| "T bend" ECCA T7: | >2T5 | 2T | 2T |
| Conical mandrel ISO 1519: | crack-free if $\phi \geq 10$ mm | crack-free if $\phi \geq 10$ mm | crack-free if $\phi \geq 10$ mm |
| Impact strength ECCA T5: | | | |
| Upper limit in Joules: | | | |
| without cracks | 4 J | 4 J | 4 J |
| without areas which have become detached: | 6 J | 8 J | 8 J |
| beginning of detachment up to the metal: | 8 J | 12 J | 12 J |
| Scratch resistance ISO 1518: | | | |
| Mini. penetration load: | 4 daN | >5 daN | >5 daN |
| Peel strength: | category | category | category |
| Grid NFT 30038: | 3 | 0 | 0 |
| Solvent resistance: | | | |
| no damage after: | 20 T-F | 20 T-F | 20 T-F |
| 3 - Tests on enameled sheet metal: | | | |
| Enamel-steel adhesion EN10209 | Category 1 | Category 1 | Category 1 |
| Surface appearance: | defect-free | defect-free | defect-free |
| Fingernail scratches: | none | none | none |
| Citric acid ISO 2722: | Category A | Category A | Category A |

According to the results, it is found:

that all the trials, carried out in the course of the invention, give enameled components of good quality (see results of tests on enameled sheet metal), whereas the shaping was carried out after application of the enamel composition;

that, in all the trials, it was possible to apply the enameling composition with a roll coater without having to adjust, during application, the viscosity of this composition; all the enameling compositions according to the invention remain stable at ambient temperature;

that, for Trials No. 2 and No. 3, better resistance to cracking, better impact strength and better peel strength of the enamel coating before vitrification firing are observed, which qualities can be attributed to the "acid" functionalities, more numerous in the resin of these enamel compositions, contributed by the product LTW with a high COOH number; these results show that, with regard to the shaping, the coating with the enameling composition according to the invention exhibits great flexibility, which renders possible major deformations of sheet metal without risk of damage, in particular when the resin of the enameling composition comprises at least 5% by weight, with respect to the total weight of polymers, of one or more polymers exhibiting a COOH number of greater than or equal to 20;

that, for Trial No. 3, a much lower coefficient of friction is observed, which coefficient is contributed by the addition, to the enamel composition, of only 1% by weight of a lubricating additive based on polyethylene wax.

What is claimed is:

1. Liquid composition for application of vitreous enamel of the type mainly comprising a thermosetting polymer resin, a solvent of said resin and more than 50% by weight of vitrifiable enamel frit, characterized in that said resin comprises:

one or more polyhydroxypolyester polymers and/or one or more polyhydroxypolyacrylate polymers in solution and/or in emulsion, exhibiting an OH (or hydroxyl) number of between 3 and 100 mg KOH per gram, which are appropriate for the average molecular weight of the dissolved fraction of said polymers to be less than 100 000 g/mol, at least one crosslinking agent suitable for reacting with the "hydroxyl" functional groups of said polymers by transesterification or by polyaddition, in an amount sufficient to crosslink said resin, an amount of catalyst sufficient to catalyze the reaction of the hydroxyl groups of said polymers and of the at least one crosslinking agent.

2. Composition according to claim 1, characterized in that said vitrifiable enamel frit comprises at least 30% by weight of $SiO_2$, at least 10% by weight of $B_2O_3$ and at least 5% by weight of $Na_2O$.

3. Composition according to claim 1, characterized in that none of said polymers comprises "epoxy" functional groups.

4. Composition according to claim 1, characterized in that, in the case of a crosslinking reaction by polyaddition, the at least one crosslinking agent is a blocked isocyanate.

5. Composition according to claim 4, characterized in that the content by weight of NCO radicals in said isocyanate is between 10 and 25% by weight.

6. Composition according to claim 4, characterized in that the amount of isocyanate in said composition is adjusted in order for the ratio of equivalence of the OH groups of said resin to the NCO groups of the crosslinking agent to be between 0.5 and 2.5.

7. Composition according to claim 1, characterized in that, in the case of a crosslinking reaction by transesterification, the at least one crosslinking agent is an aminoplast compound.

8. Composition according to claim 7, characterized in that said aminoplast compound is selected from the group consisting of alkylated urea-aldehyde, melamine-aldehyde, dicyandiamide-aldehyde and triazine-aldehyde compounds.

9. Composition according to claim 8, characterized in that said aminoplast compound is based on hexamethoxymethylmelamine.

10. Composition according to claim 1, characterized in that at least one of said polymers of the resin exhibits branching "acid" groups, so that the COOH number of said polymer is greater than or equal to 5 mg KOH per gram.

11. Composition according to claim 10, characterized in that the proportion in said resin of the at least one polymer with a COOH number of greater than or equal to 5 mg KOH per gram is greater than or equal to 5% by weight.

12. Composition according to claim 1, characterized in that it comprises a lubricating additive.

13. Composition according to claim 12, characterized in that said lubricating additive is based on polyethylene wax.

14. Process for the production of a metal sheet coated with vitrifiable enamel comprising the stages consisting in:
    preparing a vitreous enamel application composition according to claim 1,
    applying said composition to the metal sheet to be coated,
    curing the metal sheet thus coated with said composition under conditions suitable for cross-linking said resin.

15. Process according to claim 14, characterized in that the application of said composition is carried out by coating.

16. Process for the production of a metal sheet coated with vitrified enamel, characterized in that it comprises a stage of vitrification firing of a metal sheet coated with vitrifiable enamel obtained by the process according to claim 14.

17. Process for the production of a shaped component made of enameled sheet metal comprising the stages consisting in:
    preparing a vitreous enamel application composition according to claim 1,
    applying said composition to a metal sheet,
    curing the metal sheet, thus coated with said composition, under conditions suitable for crosslinking said resin,
    shaping the metal sheet, coated with said crosslinked composition, into the shape of said component to be produced,
    firing the shaped component, coated with said crosslinked composition, under conditions suitable first for producing complete pyrolysis of said crosslinked resin and suitable secondly for vitrifying said vitrifiable frit.

18. Process according to claim 17, characterized in that the application of said composition is carried out by coating.

* * * * *

UNITED STATES PATENT AND TRADEMARK OFFICE
CERTIFICATE OF CORRECTION

PATENT NO. : 6,455,625 B1 Page 1 of 1
DATED : September 24, 2002
INVENTOR(S) : Remy Hellouin, Vincent Cholet and Jean-Pierre Genevay It is certified that error appears in the above-identified patent and that said Letters Patent is hereby corrected as shown below:

<u>Title page,</u>
Item [30], should read:
[30]    Foreign Application Priority Data
October 12, 1998        (FR)        98 12769 --

Signed and Sealed this

Thirteenth Day of January, 2004

JON W. DUDAS
*Acting Director of the United States Patent and Trademark Office*